United States Patent
Yang et al.

(10) Patent No.: US 7,027,293 B2
(45) Date of Patent: Apr. 11, 2006

(54) BREAKER DISTRIBUTION MODULE

(75) Inventors: Ta-Jung Yang, Taoyuan (TW); Bi-Jen Liu, Jhongli (TW)

(73) Assignee: DELTA Electronics, Inc., Taoyuan Hsien (TW)

( * ) Notice: Subject to any disclaimer, the term of this patent is extended or adjusted under 35 U.S.C. 154(b) by 273 days.

(21) Appl. No.: 10/739,637

(22) Filed: Dec. 17, 2003

(65) Prior Publication Data

US 2005/0087433 A1   Apr. 28, 2005

(30) Foreign Application Priority Data

Oct. 23, 2003   (TW)   .............................. 92129396 A (51) Int. Cl.
*H02B 1/04* (2006.01)

(52) U.S. Cl. ....................... 361/673; 361/628; 361/631; 361/634; 361/647; 361/652; 361/656; 200/50.27

(58) Field of Classification Search ................ 361/611, 361/627–631, 634, 636, 637, 643–648, 652, 361/655, 656, 673; 200/50.01; 439/110
See application file for complete search history.

(56) References Cited

U.S. PATENT DOCUMENTS

| | | | | |
|---|---|---|---|---|
| 6,086,388 A | * | 7/2000 | Sloey et al. | ................ 439/110 |
| 6,122,160 A | * | 9/2000 | Hannula | ..................... 361/600 |
| 6,315,580 B1 | * | 11/2001 | Hurtubise et al. | ............ 439/82 |
| 6,317,311 B1 | * | 11/2001 | Middlehurst et al. | ....... 361/637 |
| 6,359,770 B1 | * | 3/2002 | Kolody et al. | .............. 361/626 |
| 6,414,245 B1 | * | 7/2002 | Lopp et al. | ................. 174/255 |

* cited by examiner

*Primary Examiner*—Boris Chervinsky
(74) *Attorney, Agent, or Firm*—J.C. Patents (57) ABSTRACT

A breaker distribution module is disclosed. The breaker distribution module essentially includes an insulation rod, a plurality of output terminals, a plurality of input busbars and a plurality of breakers. The insulation rod is composed of a plurality of insulation blocks. The output terminals are disposed on the insulation rod. The breakers connect to the output terminals and the input busbars. Each of the breakers corresponds to one of the output terminals. In addition, the insulation rod can also be manufactured as an integrative unit, and the breaker distribution module further includes a connection busbar electrically coupled to the input busbars. The design of the pluralities of insulation blocks decreases the fabricating cost. In addition, the connection busbar is able to change the output voltage disposition of the breaker distribution module.

19 Claims, 8 Drawing Sheets

BREAKER DISTRIBUTION MODULE

CROSS-REFERENCE TO RELATED APPLICATION

This application claims the priority benefit of Taiwan application serial no. 92129396, filed on Oct. 23, 2003.

BACKGROUND OF THE INVENTION

1. Field of the Invention

The present invention is generally related to a breaker distribution module. More particularly, the present invention is related to a breaker distribution module, which is able to change output voltage disposition at the same time reduce the cost.

2. Description of the Related Art

Electric power is without a doubt one of the most important energy sources and important for everyone's living in the modern world. As a consequence, an electric distribution module has also emerged as one of the most popular technologies. For example, the main power source in the communication systems uses a +24 or −48 voltages as direct voltage output. Thus, the power source used in the communication systems usually comprises a +24 voltage output, a −48 voltage output or a combination of both a +24 and −48 voltage outputs.

Figure 1:
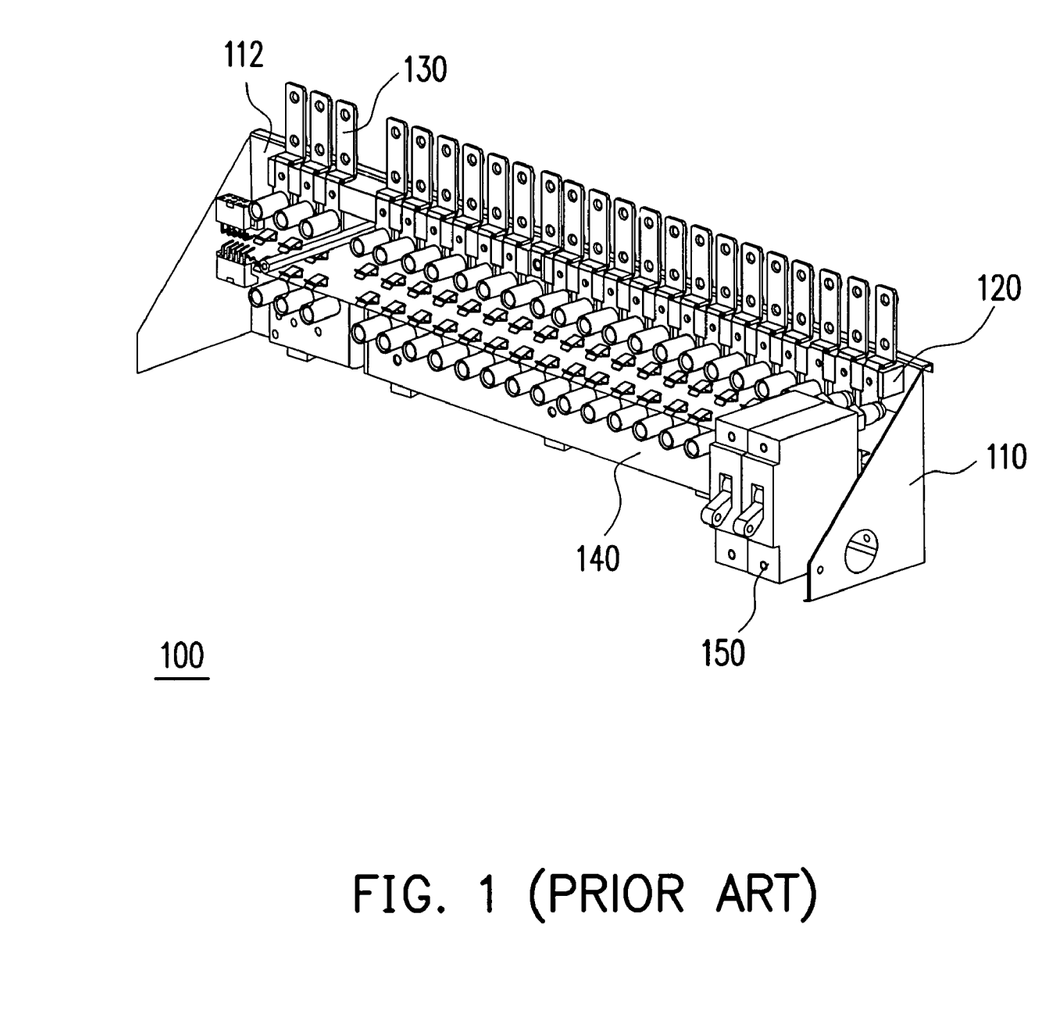
FIG. 1 illustrates a conventional breaker distribution module.

FIG. 1 shows a conventional breaker distribution module. Referring to FIG. 1, the breaker distribution module 100 includes a cover 110, an insulation rod 120, a plurality of output terminals 130, a plurality of input busbars 140 and a plurality of breakers 150. The cover 110 includes at least a main body 112. The insulation rod 120 is disposed on the main body 112. Each of the output terminals 130 is also disposed on the main body 112. Moreover, each of the breakers 150 corresponds to one of the output terminals 130 and connects in between the corresponding output terminal 130 and the input busbar 140.

The input busbars 140 of the conventional breaker distribution module 100 determines the output voltage and each of the input busbars 140 produces the same output voltage value. The downside is that the conventional distribution module 100 cannot change the output voltage values when the structure of the breaker distribution module is set or when the module is in operation carrying electricity.

Figure 2:
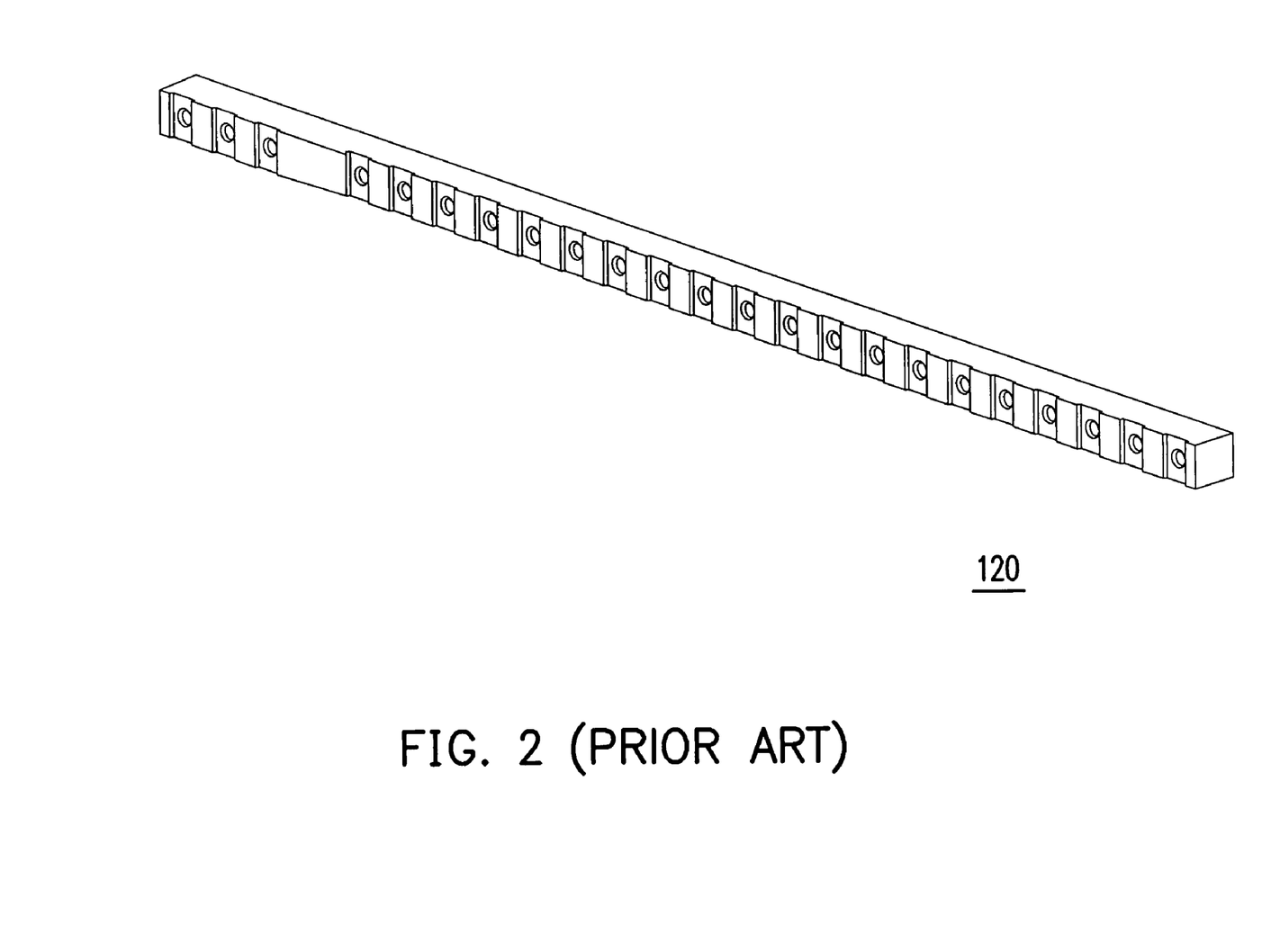
FIG. 2 shows a three dimensional structure for a conventional insulation rod.

FIG. 2 illustrates a three dimensional structure for an insulation rod 120. Because there is a distance in between each of the output terminals (for different output voltages), thus extra work is needed for the insulation rod 120 to produce different output voltages. This causes the increase in cost for producing an insulation rod 120.

Figure 3:
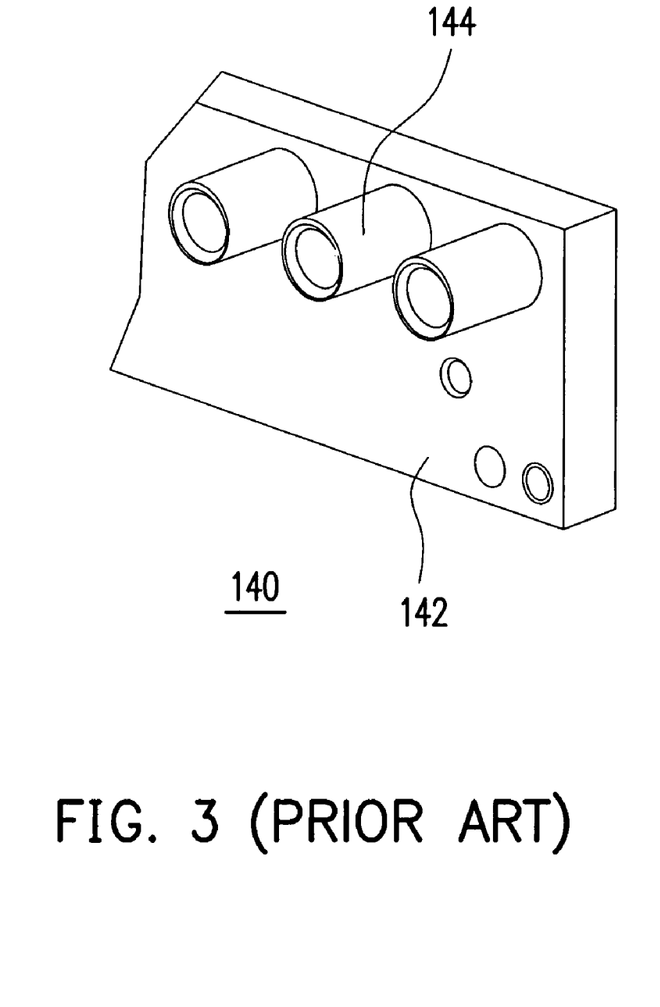
FIG. 3 shows a three dimensional structure for a conventional input busbar.

FIG. 3 illustrates a three dimensional structure for a conventional input busbar 140. The input busbar 140 is composed of a plurality of bronze columns 144 riveted on a base 142 as the output terminals. The bronze columns 144 not only increase the electrical resistance, but also increase the cost in manufacturing the input busbar 140.

Therefore, an improved breaker distribution module is desired when considering the shortcomings of the conventional breaker distribution module have and importance of such device in every day's life.

SUMMARY OF THE INVENTION

The present invention is to provide a breaker distribution module suitable for changing the voltage outputs distribution at any time.

Another objective of the present invention is to provide a breaker distribution module that reduces the manufacturing cost of the breaker distribution module.

Another objective of the present invention is to provide a breaker distribution module, which is able to detect the electrical conditions of every individual breaker within the module.

Another objective of the present invention is to provide a breaker distribution module, which is able to reduce electrical resistance.

Yet another objective of the present invention is to provide a breaker distribution module suitable for ensuring correct make up of the components of the breaker distribution module.

The breaker distribution module comprises an insulation rod, a plurality of output terminals, a plurality of input busbars and a plurality of breakers. Wherein, the insulation rod is composed by a plurality of insulation blocks. The output terminals are disposed on the insulation rod. Each of the breakers is connected in between the output terminals and the input busbars, wherein each of the breakers is corresponding to one of the output terminals.

In addition, the breaker distribution module further comprises a connection busbar electrically coupled in between each of the input busbars.

In order to meet the objectives described, the present invention further provides another breaker distribution module. The breaker distribution module comprises an insulation rod, a plurality of output terminals, a plurality of input busbars, a connection busbar and a plurality of breakers. Wherein, the output terminals are disposed on the insulation rod. The connection busbar is electrically coupling in between each of the input busbars. Each of the breakers is connected in between the output terminals and the input busbars, wherein each of the breakers is corresponding to one of the output terminals.

Moreover, the breaker distribution modules of the two embodiments of the present invention further comprises a detection printed circuit board (PCB) located in between the output terminals and the input busbars for detecting coupling conditions between each of the output terminals and the input busbars. The detection printed circuit board further comprises a plurality of connection point pairs corresponding to the output terminals. Each of the breakers further comprises at least one sub-terminal electrically coupled to the connection point pairs. Each of the input busbars has a plurality of input apertures and each of the input apertures corresponds to one of the output terminals.

Moreover, each of the breakers has a blade switch in the breaker's front side. In addition, each of the breakers has a plurality of connection terminals electrically coupled to the output terminals and the input busbars in the breaker's backside. The breaker distribution module further comprises a cover. The cover comprises a main cover body; and a fixed cover pivotedly connected on the main cover body. The fixed cover has an aperture that corresponds to the blade switches.

Moreover, each of the output terminals comprises a supporting body, a first connection port and a second connection port. Wherein, the supporting body is disposed on the insulation rod. The first connection port is connected to one side of the supporting body, and the second connection port is connected to the other side of the supporting body. Each of the second connection ports has an output aperture. Moreover, each of the insulation blocks has a first connection structure on one side of the insulation block and a corresponding second connection structure on the other side of the insulation block.

To summarize, the advantages of the breaker distribution module of the present invention include:
1. The insulation rod is a collection-of-components type. It is able to adjust the output voltages in a flexible mariner thereby reducing the cost.
2. The detection printed circuit board is able to individually detect the electric conditions for every breaker.
3. The input busbars have lower electrical resistance compared to the bronze columns in the conventional breaker distribution module.
4. The connection busbar is able to flexibly change the distribution of the output voltages.
5. The fixed cover is able to ensure the correct make up of the components of the breaker distribution module.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 4:
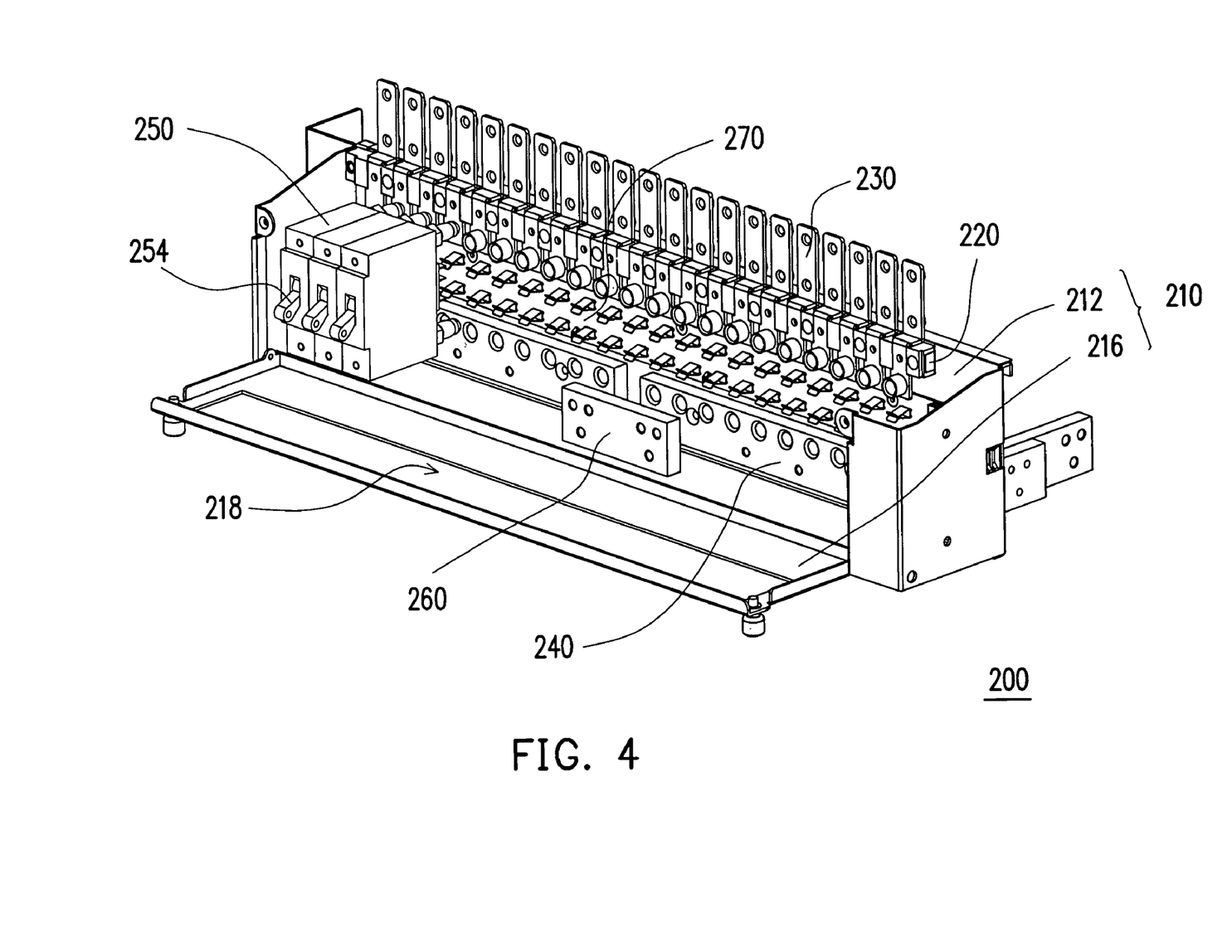
FIG. 4 illustrates an improved breaker distribution module as one preferred embodiment of the present invention.

FIG. 4 illustrates a breaker distribution module as one preferred embodiment of the present invention. Referring to FIG. 4, a breaker distribution module 200 includes an insulation rod 220, a plurality of output terminals 230, a plurality of input busbars 240 and a plurality of breakers 250. The insulation rod 220 is composed by a plurality of insulation blocks 220a. The output terminals 230 are disposed on the insulation rod 220. Each of the breakers 250 is connected in between the output terminals 230 and the input busbars 240. Each of the breakers 250 is corresponded to one of the output terminals 230. The breakers 250 determine the electric conditions between the output terminals 230 and the input busbars 240.

In addition, the breaker distribution module 200 further includes a connection busbar 260 electrically coupled in between each of the input busbars 240. The breaker distribution module 200 distributes the same output voltages when the connection busbar 260 is electrically coupling to each of the input busbars 240. On the other hand, the breaker distribution module 200 distributes different output voltages when the connection busbar 260 is not electrically coupling to the input busbars 240.

Figure 5:
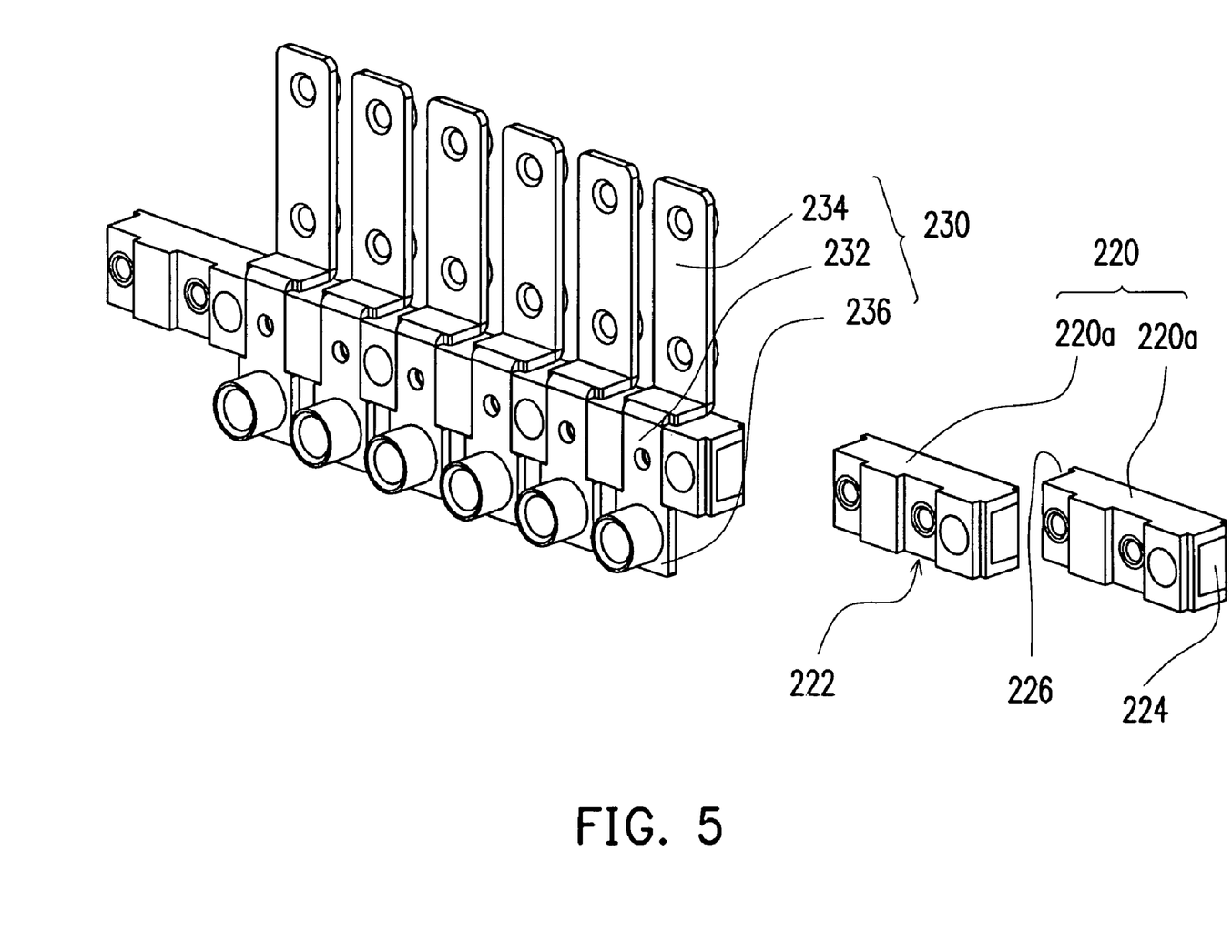
FIG. 5 illustrates three-dimensional structures for an insulation rod and an output terminal as another preferred embodiment of the present invention.

FIG. 5 illustrates three-dimensional structures for an insulation rod and an output terminal as another preferred embodiment of the present invention. Referring to FIG. 4 and FIG. 5, the insulation rod 220 is a component-type structure composed by the plurality of insulation blocks 220a. Each of the insulation blocks 220a has a first connection structure 224 on one side of the insulation block 220a and a corresponding second connection structure 226 on the other side of the insulation block 220a. An insulation block 220a can use the first connection structure 224 that joints to another second connection structure 226 of another insulation block 220a. Moreover, the embodiment of the present invention uses corresponding connection structures 224 and 226, thus it is flexible to adjust the number of insulation blocks 220a needed. In addition, the distribution of the insulation blocks 220a can also be changed in accordance to the different output voltage distributions.

Moreover, each of the output terminals 230 further includes a supporting body 232, a first connection port 234 and a second connection port 236. Each of the insulation blocks 220a has at least one concave structure 222. Wherein the supporting body 232 can be disposed on the concave structure 222 of the insulation blocks 220a thereby making the output terminals 230 fixed in location. The first connection port 234 is connected to one side of the supporting body 232 and the second connection port 236 is connected to the other side of the supporting body 232 within the same output terminal 230. Moreover, each of the second connection ports 236 further includes a bronze column or an output aperture.

Figure 6:
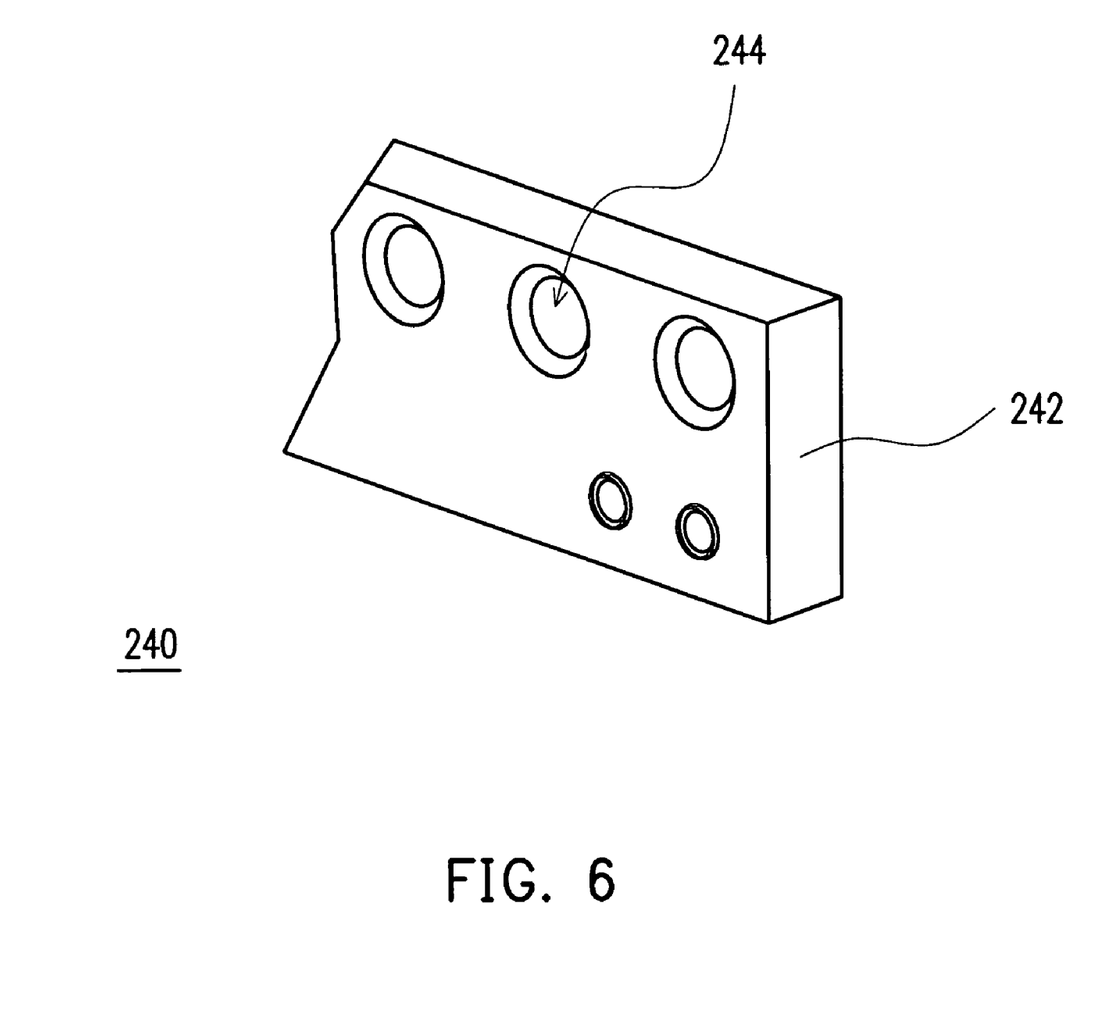
FIG. 6 illustrates a three-dimensional structure for an input busbar as another preferred embodiment of the present invention.

FIG. 6 illustrates a three-dimensional structure for an input busbar as another preferred embodiment of the present invention. Referring to FIG. 4 and FIG. 6, the input busbars 240 does not connect to bronze columns like the prior art, instead the input busbars 240 forms a plurality of input apertures 244 corresponding to the output terminals 230. By doing so not only reduces the electrical resistance between the breakers 240 and the input busbars 240, but also reduces the materials and cost required to connect to the bronze columns.

Figure 7:
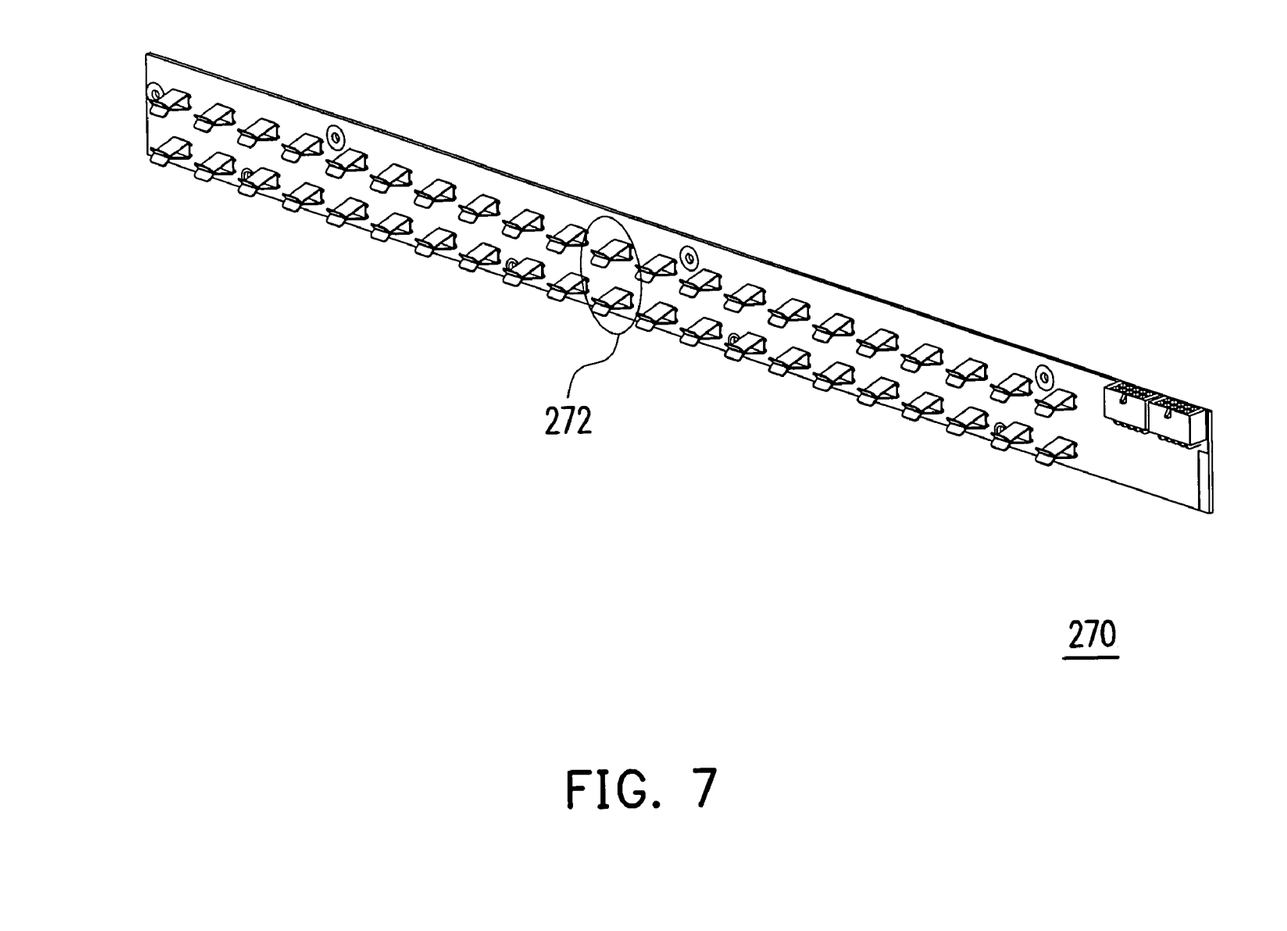
FIG. 7 illustrates a three-dimensional structure for a detection printed circuit board (PCB) as another preferred embodiment of the present invention.
Figure 8:
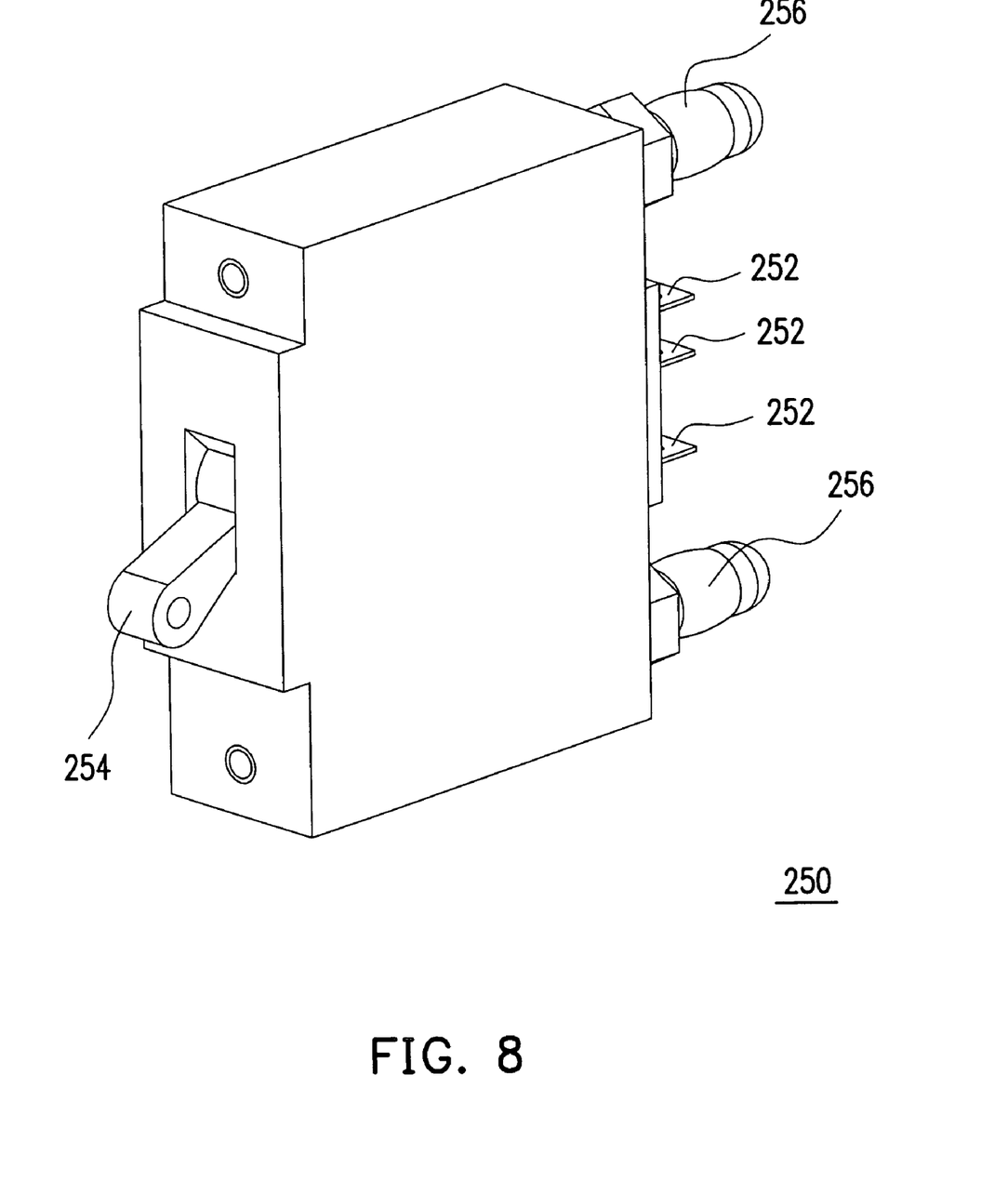
FIG. 8 illustrates a three-dimensional structure for a breaker as another preferred embodiment of the present invention.

Referring to FIG. 4, the breaker distribution module 200 further includes a detection printed circuit board (PCB) 270 located in between the output terminals 230 and the input busbars 240 for detecting the coupling conditions between each of the output terminals 230 and the input busbars 240 individually. FIG. 7 and FIG. 8 illustrate three-dimensional structures for a detection printed circuit board (PCB) 270 and a breaker 250 respectively as yet another preferred embodiment of the present invention. Referring to FIG. 4, FIG. 7 and FIG. 8, the detection printed circuit board 270 further includes a plurality of connection point pairs 272 corresponding to the output terminals 230. Each of the breakers 250 further includes at least one sub-terminal 252 electrically coupled to the connection points pairs 272. The detection printed circuit board 270 is able to detect the coupling conditions between each of the output terminals 230 and the input busbars 240 individually by having the sub-terminals 252 connecting to the connection point pairs 272.

Referring to FIG. 4 and FIG. 8, each of the breakers 250 has a blade switch 254 in the front side of the breakers 250. In addition, each of the breakers 250 has a plurality of connection terminals 256 electrically coupled to the output terminals 230 and the input busbars 240 in the back side of the breaker 250.

Also referring to FIG. 4, the breaker distribution module 200 further includes a cover 210. The cover 210 includes a main cover body 212 and a fixed cover 216. The fixed cover 216 is pivotedly connected on the main cover body 212. In addition, the fixed cover 216 has an aperture 218 that corresponds to the blade switches 254. Furthermore, the blade switches 254 cannot be exposed through the apertures 218 when the components of the breaker distribution module 200 are improperly placed. Thus, the blade switches 254 touch the fixed cover 216. As a result, the fixed cover 216 is not able to connect to the main cover body 212 in a fixed location. This provides additional safety protection for the breaker distribution module 200.

It is important to note the improvements and characteristics provided for the breaker distribution module of the present invention do not have to co-exist at the same time. The characteristics can also be individually applied to any other breaker distribution modules.

To summarize, the advantages of the breaker distribution module of the present invention—include at least:

1. The insulation rod is a collection-of-components type. Therefore the insulation rod is able to adjust the output voltages in a flexible manner and simplify a plastic injection molding process without changes (previously due to different structural designs of the insulation rod) thereby reduce the cost.
2. As the connection busbar can be added or removed easily, the connection busbar can flexibly change the output voltage distributions even after the connection busbar has been constructed or when the connection busbar carries electricity.
3. The conventional bronze columns have been replaced by the input busbars resulting lower electrical resistance compared to the bronze columns of the conventional breaker distribution module.
4. The detection printed circuit board is able to individually detect the electric conditions for every breaker thereby enable a user to monitor and fix problems within the breaker distribution module in the first instance.
5. The fixed cover can only be fixed when every component within the breaker distribution module has been correctly set up and placed. Thus, the fixed cover provides additional safety protection for the breaker distribution module.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A breaker distribution module, comprising:
   an insulation rod composed by a plurality of insulation blocks;
   a plurality of output terminals disposed on the insulation rod;
   a plurality of input busbars; and
   a plurality of breakers, each connecting in between the output terminals and the input busbars, wherein each of the breakers corresponds to one of the output terminals.

2. The breaker distribution module of claim 1 further comprises a connection busbar electrically coupled in between each of the input busbars.

3. The breaker distribution module of claim 1 further comprises a detection printed circuit board (PCB) located in between the output terminals and the input busbars for detecting coupling conditions between each of the output terminals and the input busbars individually.

4. The breaker distribution module of claim 3, wherein the detection printed circuit board further comprises a plurality of connection point pairs corresponding to the output terminals, and each of the breakers further comprises at least one sub-terminal electrically coupled to the connection points pairs.

5. The breaker distribution module of claim 1, wherein each of the input busbars is having a plurality of input apertures, each of which corresponding to the output terminals.

6. The breaker distribution module of claim 1, wherein each of the breakers is having a blade switch in a front side of the breaker and a plurality of connection terminals electrically coupling to the output terminals and the input busbars in a back side of the breaker.

7. The breaker distribution module of claim 6 further comprising a cover, the cover comprising:
   a main cover body; and
   a fixed cover pivotedly connected on the main cover body, wherein the fixed cover has an aperture with a position corresponded to the blade switches.

8. The breaker distribution module of claim 1, wherein each of the output terminals comprising:
   a supporting body disposed on the insulation rod;
   a first connection port connected to one side of the supporting body; and
   a second connection port connected to the other side of the supporting body.

9. The breaker distribution module of claim 8, wherein the second connection port is having an output aperture.

10. The breaker distribution module of claim 1, wherein each of the insulation blocks is having a first connection structure on one side of the insulation block and a corresponding second connection structure on the other side of the insulation block.

11. A breaker distribution module, comprising at least:
    an insulation rod; composed by a plurality of insulation blocks
    a plurality of output terminals disposed on the insulation rod;
    a plurality of input busbars;
    a connection busbar electrically coupling in between each of the input busbars; and
    a plurality of breakers, each of which connecting in between the output terminals and the input busbars, wherein each of the breakers corresponds to one of the output terminals.

12. The breaker distribution module of claim 11 further comprises a detection printed circuit board (PCB) located in between the output terminals and the input busbars for detecting coupling conditions between each of the output terminals and the input busbars individually.

13. The breaker distribution module of claim 12, wherein the detection printed circuit board further comprises a plurality of connection point pairs that corresponded to the output terminals, and each of the breakers further comprises at least one sub-terminal electrically coupled to the connection point pairs.

14. The breaker distribution module of claim 11, wherein each of the input busbars is having a plurality of input apertures each corresponding to the output terminals.

15. The breaker distribution module of claim 11, wherein a front side of each of the breakers is having a blade switch and a back side of each of the breakers is having a plurality of connection terminals electrically coupling to the output terminals and the input busbars.

16. The breaker distribution module of claim 15 further comprising a cover, the cover comprising:
    a main cover body; and
    a fixed cover pivotedly connected on the main cover body, wherein the fixed cover is having an aperture positioning corresponding to the blade switches.

17. The breaker distribution module of claim 11, each of the output terminals comprising:
    a supporting body disposed on the insulation rod;
    a first connection port connected to one side of the supporting body; and
    a second connection port connected to the other side of the supporting body.

18. The breaker distribution module of claim 17, wherein the second connection port is having an output aperture.

19. The breaker distribution module of claim 11, wherein each of the insulation blocks is having a first connection structure on one side of the insulation block and a corresponding second connection structure on the other side of the insulation block.

* * * * *